United States Patent [19]

Brooks et al.

[11] 4,364,759

[45] Dec. 21, 1982

[54] METHODS FOR PREPARING ANISOTROPIC HOLLOW FIBER MEMBRANES COMPRISING POLYMER OF ACRYLONITRILE AND STYRENE AND HOLLOW FIBER MEMBRANES PRODUCED THEREFROM

[75] Inventors: Albert A. Brooks, St. Louis; Jay M. S. Henis; Mary K. Tripodi, both of Creve Coeur, all of Mo.

[73] Assignee: Monsanto Company, St. Louis, Mo.

[21] Appl. No.: 122,956

[22] Filed: Feb. 20, 1980

Related U.S. Application Data

[63] Continuation-in-part of Ser. No. 24,754, Mar. 28, 1979, abandoned.

[51] Int. Cl.$^3$ ............... B01D 53/22; B29D 27/04; B32B 3/20; D01F 6/18
[52] U.S. Cl. ............................ 55/487; 55/16; 55/69; 55/70; 55/73; 55/158; 55/524; 55/528; 210/500.2; 264/41; 264/178 F; 264/182; 264/209.1; 264/344; 428/398
[58] Field of Search ............. 210/500.2; 428/398; 55/528, DIG. 16, 69, 70, 73, 16, 158, 524, 487; 264/41, 178 F, 182, 209.1, 344

[56] References Cited

U.S. PATENT DOCUMENTS

| | | |
|---|---|---|
| 3,615,024 | 10/1971 | Michaels . |
| 3,674,628 | 7/1972 | Fabre ................... 264/209 |
| 3,871,950 | 3/1975 | Hashino et al. . |
| 3,930,105 | 12/1975 | Christen et al. ............ 428/398 |
| 3,950,257 | 4/1976 | Ishii ...................... 210/500 M |
| 3,975,478 | 8/1976 | Leonard ................. 210/500 M |
| 4,025,439 | 5/1977 | Kamada et al. .......... 210/500 M |
| 4,177,150 | 12/1979 | Inoue et al. ............. 210/500 M |

FOREIGN PATENT DOCUMENTS

| | | |
|---|---|---|
| 54-10282 | 1/1979 | Japan . |
| 1424420 | 2/1976 | United Kingdom . |
| 1434055 | 4/1976 | United Kingdom . |

OTHER PUBLICATIONS

Strathmann et al., "The Formation Mechanism of Assymmetric Reverse Osmosis Membranes", *4th International Symposium on Fresh Water From the Sea*, vol. 4 (1973) 381–394.

Davis et al., *Desalinisation*, vol. 22 (1977) 221–227.

Cabasso et al., *Journal of Applied Polymer Science*, vol. 23 (1979) 1509–1525.

*Primary Examiner*—James C. Cannon
*Attorney, Agent, or Firm*—Robert L. Broad

[57] ABSTRACT

Anisotropic hollow fiber membranes comprising polymer of acrylonitrile and styrene are prepared by extruding a solution of a hollow fiber-forming polymer comprising polymer of acrylonitrile and styrene in a liquid carrier through an annular spinnerette to form a hollow fiber precursor, and the hollow fiber precursor is coagulated in a liquid coagulant comprising water to form a hollow fiber membrane. The liquid carrier used in the method comprises N,N-dimethylformamide and preferably contains non-solvent for the polymer of acrylonitrile and styrene. The hollow fiber membranes have a homogeneously-formed thin selective skin on an open cellular support and exhibit high resistance to collapse. The membranes are especially useful for the separation of gases.

17 Claims, 3 Drawing Figures

METHODS FOR PREPARING ANISOTROPIC HOLLOW FIBER MEMBRANES COMPRISING POLYMER OF ACRYLONITRILE AND STYRENE AND HOLLOW FIBER MEMBRANES PRODUCED THEREFROM

This is a continuation-in-part of U.S. patent application Ser. No. 24,754, filed Mar. 28, 1979, now abandoned herein incorporated by reference.

This invention pertains to methods for preparing anisotropic hollow fiber membranes comprising polymer of acrylonitrile and styrene. Particularly attractive aspects of this invention include methods for preparing hollow fiber membranes comprising polymer of acrylonitrile and styrene suitable for the separation of gases in which the material of the hollow fiber membrane effects separation by selective permeation and anisotropic hollow fiber membranes comprising polymer of acrylonitrile and styrene.

The viability of the use of membranes for fluid separations as compared to other separation procedures such as absorption, adsorption, and liquefaction often depends on the cost of the apparatus and its operation including energy consumption, degree of selectivity of separation which is desired, the total pressure losses caused by the apparatus for conducting the separation procedure which can be tolerated, the useful life of such apparatus, and the size and ease of use of such apparatus. In order for selective separation of the one or more desired components in a fluid stream by the use of separation membranes to be commercially attractive, the membranes must not only be capable of withstanding the conditions to which they may be subjected to during the separation operation, but also must provide an adequately selective separation of one or more desired components at a sufficiently high flux, i.e., permeation rate of the permeate per unit surface area, so that the use of membranes to effect the separation is economically attractive.

Membranes have been prepared in film and in hollow fiber form. Film membranes may frequently not be as attractive as other gas separation apparatus due to the need for film membranes to be supported to withstand operating conditions and the overall complexity of apparatus containing film membranes. Membranes in the configuration of hollow fibers may overcome some of the deficiencies of film membranes for many separation operations. The hollow fibers are generally self-supporting even under operating conditions, and can provide a greater amount of membrane surface area per unit volume of separation apparatus than that which may be provided by film membranes. Thus, separation apparatus containing hollow fibers may be attractive from the standpoint of convenience, in size and reduced complexity of design. Moreover, in order to be commercially viable on an economic basis, a hollow fiber membrane, even if capable of providing desired selectivities of separation, fluxes and strength, must also be capable of being manufactured in large quantities while achieving a reliable product quality and being readily and relatively inexpensively assembled in a permeator.

Polymers of acrylonitrile and styrene can provide desirable selectivities of separation, especially for the separation of gases such as hydrogen from carbon monoxide, nitrogen, methane, etc., or oxygen from nitrogen. In order to achieve advantageous fluxes, desirable hollow fiber membranes comprising polymer of acrylonitrile and styrene may be unitary anisotropic hollow fiber membranes which have a relatively thin layer (often referred to as separating layer, barrier layer, or active layer) integral with a porous structure which provides support to the separating layer and offers little, if any, resistance to the passage of fluids. In order to prepare these integral anisotropic hollow fiber membranes, a unitary membrane structure must be formed which possesses diametrically opposed structures. The separating layer must be formed such that it is thin and possesses few, if any, pores or other defects. On the other hand, the conditions which make the integral anisotropic hollow fiber membrane must also provide a support which is highly open such that it offers little resistance to fluid flow. Processes for the formation of integral anisotropic hollow fiber membranes must not only meet the criteria for forming integral anisotropic hollow fiber membranes but also must be compatible with hollow fiber spinning capabilities. Hence, many constraints are placed upon the techniques available to produce integral anisotropic hollow fiber membranes.

Commonly, in hollow fiber membrane spinning procedures, a solution of the polymer to form the hollow fiber membrane in a solvent is extruded through a spinnerette suitable for forming a hollow fiber structure, and the hollow fiber extrudate must quickly be coagulated, e.g., by contact with the non-solvent for the polymer, such that the hollow fiber configuration can be maintained. The hollow fiber spinning process contains many variables which may affect the structure, or morphology, of the hollow fiber membrane. The nature of the solvent for the polymer may be highly influential in determining the morphology of the hollow fiber membrane and its separation properties.

The solvent must possess numerous properties in order to be suitable for forming anisotropic hollow fiber membranes. For example, the solvent (or a liquid carrier containing solvent) must be capable of dissolving the polymer for forming the hollow fiber membrane but yet permit coagulation to form the hollow fiber structure. Furthermore, the solvent (or a liquid carrier containing solvent) should enable polymer solution to be prepared having suitable viscosities for hollow fiber membrane formation, and advantageously, these viscosities can be obtained without using excessively high concentrations of polymer in the solution. Since advantageous hollow fiber membranes are often obtained when the extrudate incurs a significant temperature drop upon exiting the spinnerette, the solvent (or a liquid carrier containing the solvent) should enable suitable viscosities for hollow fiber formation to be provided at elevated temperatures which elevated temperatures facilitate achieving the significant temperature drop. The solvent or any other component of the liquid carrier should not be subject to degradation at such elevated temperatures. The solvent should be miscible with non-solvent used to assist in coagulating the polymer and should be capable of being removed, e.g., by washing, from the coagulated structure such that the hollow fiber membrane is not unduly plasticized, and thereby weakened, by the solvent. Moreover, the solvent (or a liquid carrier containing solvent) should not exhibit excessive heats of dilution in the non-solvent used to assist in effecting coagulation.

In order for a spinning procedure to be attractive for the production of commercial quantities of hollow fiber membranes, it is also desired that the procedure should be safe and economical. Thus, the solvent should not be unduly toxic, and advantageously, the solvent exhibits a very low vapor pressure to minimize risk of inhalation and/or air pollution. Moreover, a solvent having a very low vapor pressure may also minimize the risk of explosion and fire. Furthermore, waste materials from the spinning process should be able to be economically and safely discarded or recycled.

Since the solvent is only one component used in the spinning procedure, other components such as fluid within the bore of the hollow fiber extrudate to maintain the hollow fiber configuration of the hollow fiber extrudate, non-solvent to assist in effecting coagulation, washing fluids to remove solvent from hollow fiber membranes, and the like should also be economical and safe. Accordingly, it is desired to use highly safe, readily available materials, such as water, wherever possible in the spinning process, especially as non-solvent to assist in effecting coagulation and in washing to remove solvent from the hollow fiber membrane. The ability to use water, of course, will depend to a large extent upon the properties of the solvent with respect to water, i.e., solubility in water, heat of dilution in water, stability in water, and the like.

By this invention methods are provided for preparing anisotropic hollow fiber membranes comprising polymer of acrylonitrile and styrene, which methods utilize a solvent comprising N,N-dimethylformamide (hereafter "dimethylformamide"). The methods of this invention can provide anisotropic hollow fiber membranes comprising polymer of acrylonitrile and styrene characterized by having a very thin separating layer having relatively few pores on an underlying region having an open, cellular structure which offers little resistance to fluid flows. These hollow fiber membranes may be particularly attractive for gas separations. Advantageously, the methods of this invention can utilize water as a non-solvent to assist in effecting the coagulation of the polymer and to wash solvent from the hollow fiber membranes.

In accordance with this invention, a solution of a hollow fiber-forming polymer comprising polymer of acrylonitrile and styrene in a liquid carrier comprising dimethylformamide is extruded through an annular spinnerette to form a hollow fiber precursor, and the hollow fiber precursor is coagulated in a liquid coagulant comprising water to form a hollow fiber membrane.

The polymers of styrene and acrylonitrile which includes copolymers, terpolymers and other polymers containing styrene and acrylonitrile, which may be useful in accordance with this invention frequently contain up to about 60 or 70, say, about 10 to 50, mole percent styrene based on the total monomer in the polymer. Advantageously, the acrylonitrile monomer comprises at least about 20, e.g., about 20 to 90, often about 30 to 80, mole percent of the polymer. Other monomers which may be employed with styrene and acrylonitrile to provide, e.g., terpolymers, include olefinic monomers such as butene, butadiene, methylacrylate, methylmethacrylate, maleic anhydride, and the like. The polymers (e.g., copolymers or terpolymers) of styrene and acrylonitrile often have a weight average molecular weight of at least about 25,000 or 50,000, say, about 75,000 to 500,000 or more.

In the method of this invention the polymer solution is at a sufficient temperature such that the polymer is substantially maintained in solution and is at a fiber-forming viscosity for extrusion of the hollow fiber precursor. A fluid is injected into the bore of the hollow fiber precursor as it is being extruded from the spinnerette at a rate sufficient to maintain the bore of the hollow fiber precursor open. The injection fluid is preferably highly miscible with the liquid carrier and often, therefore, comprises water. The hollow fiber precursor is then contacted with the liquid coagulant which is a non-solvent for the polymer in the polymer solution. The liquid coagulant is preferably highly miscible with the liquid carrier and the injection fluid. Usually the temperature of the liquid cogulant is sufficiently low that the polymer solution at that temperature is extremely viscous and may even be a gel. The contact of the hollow fiber precursor with the liquid coagulant is for sufficient duration to substantially completely coagulate the polymer in the hollow fiber precursor under the conditions of the liquid coagulant and thereby provide a hollow fiber. The hollow fiber is then washed, i.e., contacted, with a non-solvent comprising water for the polymer which is miscible with the liquid carrier to reduce the content of the liquid carrier in the hollow fiber to less than about 5 weight percent based on the weight of the polymer in the hollow fiber. The washed hollow fiber may then be dried at a temperature at which the selectivity or flux exhibited by the hollow fiber is not unduly adversely affected.

The liquid carrier may consist essentially of dimethylformamide or the dimethylformamide may be admixed with one or more other components to provide the liquid carrier. The other components may be solid or liquid at room temperature but are dissolved when in the liquid carrier. In many instances, especially when the hollow fiber precursor is exposed to the atmosphere during spinning it is preferred that the liquid carrier be relatively non-volatile, e.g., the liquid carrier advantageously has an essential absence of a component having a vapor pressure above about 0.8, say, above 0.6, atmosphere at the temperature of the polymer solution at extrusion. If, however, a more volatile component is used in the liquid carrier and the hollow fiber precursor is exposed to an atmosphere prior to contacting the liquid coagulant, the atmosphere may beneficially contain substantial amounts of such a more volatile component to retard the loss of the component. Gaseous components are generally avoided but may be of use especially when the hollow fiber precursor is immediately contacted with the liquid coagulant. The components are preferably compatible with the solvent and the liquid coagulant. Often the other components are highly soluble in dimethylformamide, e.g., at least about 50, preferably at least about 100, parts by weight can be dissolved in 100 parts by weight of dimethylformamide at room temperature (about 25° C.), and the other components are preferably miscible with dimethylformamide and the liquid coagulant in all proportions. Components other than dimethylformamide which may be useful in the liquid carrier include solvents, such as dimethylacetamide, 1-formylpiperidine, N-methylpyrrolidone, dimethylsulfoxide, etc.; viscosity modifiers, such as isopropyl amine; surfactants; plasticizers; and the like. A particularly useful component for the liquid carrier is a diluent which may be a solvent or non-solvent for the polymer. Frequently, dimethylformamide comprises at least about 40, say, at least about 60 weight percent of the liquid carrier.

The use of diluents can provide particularly attractive liquid carriers such that certain solvent activities with the individual polymer molecules are exhibited such that frequently, the polymer can be coagulated or gelled from the polymer solution with little, if any, change in energy. The behavior of polymer molecules in solution is theorized to be influenced by not only the interaction among the polymer molecules, but also by the effect of dimethylformamide (and liquid carrier) on the polymer molecule.

Preferably liquid carriers used in the method of this invention contain a diluent which is a non-solvent for the polymer of acrylonitrile and styrene. Non-solvents are generally characterized by exhibiting little capability of dissolving the polymer of acrylonitrile and styrene, e.g., the polymer solubility is less than about 10, say, less than 2, often less than about 0.5, grams per 100 milliliters of non-solvent. The non-solvent preferably exhibits little, if any, swelling action on the polymer of acrylonitrile and styrene. The non-solvent, if added in a sufficient amount, is usually capable of resulting in a phase separation in the polymer solution. Preferably, the non-solvent is not added in an amount such that the polymer solution is unduly unstable at the processing conditions prior to forming the hollow fiber precursor. Frequently, the amount of non-solvent in the liquid carrier is at least about 2, e.g., at least about 5, weight parts per 100 weight parts of the liquid carrier. Preferably, the addition of relatively small quantities of liquid coagulant to a solution of the polymer in the liquid carrier will result in phase separation or gelling of the polymer.

Typical diluents, including non-solvents, include formamide, acetamide, ethylene glycol, water, trimethylamine, triethylamine, isopropylamine, isopropanol, methanol, nitromethane, 2-pyrrolidone, acetic acid, formic acid, aqueous ammonia, methyl ethyl ketone, acetone, glycerol and the like. Low molecular weight inorganic salts such as lithium chloride, lithium bromide, zinc chloride, magnesium perchlorate, lithium nitrate, and the like may also be useful in the liquid carrier. Suitable non-solvents can include the liquid coagulant or one or more components of the liquid coagulant.

Table A provides a list of diluents which may be attractive for making hollow fiber membranes in accordance with the methods of this invention.

TABLE A

| Diluent | General Liquid Carrier Compositions, parts by weight | | Preferred Liquid Carrier Compositions, parts by weight | |
| --- | --- | --- | --- | --- |
| | Dimethyl-formamide | Diluent | Dimethyl-formamide | Diluent |
| Formamide | 60–95 | 5–40 | 70–85 | 15–30 |
| Ethylene Glycol | 40–95 | 5–60 | 50–85 | 15–50 |
| Water | 75–98 | 2–25 | 85–98 | 2–15 |

A sufficient amount of polymer is contained in the polymer solution to provide a fiber-forming viscosity at the temperature of the polymer solution when formed (i.e., extruded) into a hollow fiber precursor. Unduly low viscosities can result in the breakage of the hollow fiber precursor and the inability to maintain the desired hollow fiber configuration. High viscosities are desirable, but excessively high viscosities may be undesirable due to the pressures required to extrude the polymer solution. Frequently the viscosity of the polymer solution being extruded is at least about 5000, often at least about 10,000, centipoises and may be as high as 500,000 or 1,000,000, centipoises at the temperature of the extrusion. Many attractive hollow fiber membranes are prepared utilizing polymer solution viscosities at the temperature of extrusion in the range of about 10,000 to 500,000 centipoises. In some instances, sufficient polymer is contained in the polymer solution that at the temperature of the liquid coagulant, the polymer solution becomes a substantially non-flowing structure, for instance, becomes extremely viscous or undergoes a physical change, e.g., to form a gel, (i.e., an elastic structure in which at least some of the polymer is not soluble in the liquid carrier and liquid carrier is entrapped in the interstices) or to result in a phase separation.

The polymer concentration in the polymer solution is conveniently sufficiently high in order to ensure that the hollow fiber membrane contains sufficient polymer to provide the desired high strength. Preferably, a sufficiently high polymer concentration is employed such that under the coagulation conditions, few, if any, macrovoids are formed. Macrovoids are large voids having a major dimension greater than about 3 microns. The maximum polymer concentrations which can be used in a polymer solution is generally determined on a practical basis by the capability of conventional hollow fiber spinning apparatus to form hollow fibers from highly viscous polymer solutions. The maximum, preferred concentrations of polymer in the polymer solution will also depend on the nature of the polymer and of the liquid carrier. For instance, with lower molecular weight polymers, higher polymer concentrations can be more desirably utilized than with higher molecular weight polymers. Frequently, the polymer concentration is at least about 25 weight percent of the polymer solution. Polymer concenetrations as high as 45 or 50 percent may be useful in some situations. Polymer concentrations of about 28 or 30 to 38 or 40 weight percent are most often desired.

The polymer solution can be prepared in any convenient manner, for instance, the liquid carrier can be added to the polymer, the polymer can be added to the liquid carrier, or the polymer and the liquid carrier can be simultaneously combined. The liquid carrier, of course, if comprising more than one component, can be admixed with the polymer on a component-by-component basis. For instance, if the liquid carrier comprises dimethylformamide and a non-solvent, the polymer may advantageously be admixed with the solvent prior to the addition of the non-solvent. When the non-solvent is added subsequent to dissolving the polymer in the solvent, generally the non-solvent is added slowly such that the localized zones of increased non-solvent concentrations are minimized to avoid coagulation, or precipitation, of the polymer at such localized zones. Elevated temperatures may be utilized to facilitate the mixing of the polymer and the liquid carrier. However, the temperature should not be so high as to deleteriously affect any of the components of the solution being prepared. The time required to effect mixing to provide a polymer solution can vary widely depending upon the rate of solution of the components, the temperature, the efficiency of the mixing apparatus, the viscosity of the polymer solution being prepared, and the like. Desirably, the mixing of the polymer solution should continue until a substantially uniform composition exists throughout the polymer solution. Any suitable mixing equipment may find application in preparing polymer solutions suitable for use in accordance with this invention. Preferably, the mixing equipment does not include undue air entrapment in the polymer solution in order to facilitate any subsequent degassing of the polymer solution. In most instances the mixing of the polymer and liquid carrier is conducted in an essentially sealed container. An inert atmosphere may be provided in such sealed containers. It is possible that components for the polymer solution may be adversely affected when exposed to atmospheric conditions (e.g., ambient air). The total pressure of the atmosphere in the mixing container is preferably relatively low in order to minimize any dissolving or entrapment of the inert atmosphere in the polymer solution during formation of the polymer solution. In most instances, pressures below about 2 or 3 atmospheres absolute are used.

Frequently the polymer solution contains entrapped or dissolved gases, which gases may result in the formation of anomalies, e.g., macrovoids, in the hollow fiber membranes. Thus, it is generally desirable to subject the polymer solution to degassing operations. Preferably, the polymer solution is substantially free of entrapped or dissolved gases prior to extruding the hollow fiber precursor. Any suitable degassing apparatus and conditions may be useful in effecting the degassing. For example, adequate degassing may be achieved by holding the polymer solution in a closed vessel for a time sufficient to allow the entrapped or dissolved gases to escape from the polymer solution. Conventional degassing equipment such as "J" tubes, centrifugal degassers, ultrasonic degassers, and the like, may find application in degassing the polymer solution. The polymer solution may be degassed at an elevated temperature. The elevated temperatures to which the polymer solution may be subjected and the times for which the polymer solution is at such elevated temperatures, should not be so excessive as to result in deleterious effects to the polymer solution or its components. The degassing may be conducted at relatively low absolute pressures (i.e., vacuum) or at such higher pressures as to prevent, e.g., undue volatilization of any of the components of the polymer solution. The pressure should not be so high as to result in an undue dissolving or redissolving of gases from the atmosphere in the degassing apparatus. In general, the degassing is preferably conducted at an absolute pressure below about 2 atmospheres, and most often the degassing is conducted at a subatmospheric pressure. The degassing may be conducted in a sealed vessel. An inert atmosphere may be used during the degassing operation.

The degassed polymer solution can then be passed to the spinnerette for forming the hollow fiber precursor. In transporting the polymer solution, it is preferred that the piping and pumping apparatus be designed such that gas (e.g., air) does not leak into the transport system and enter the polymer solution. The polymer solution may contain solid impurities, e.g., dust, which may adversely affect the hollow fiber. Often, therefore, the polymer solution is filtered prior to entering the spinnerette. Preferably, the filtering is sufficient to remove substantially all solid particles greater than about, say, 50 microns in major dimension, and often substantially all particles greater than about 0.5 microns in greatest dimension are removed by filtering. Elevated temperatures may be used to facilitate any transport and filtering of the polymer solution. Such elevated temperatures, however, should not be so high as to result in any deleterious effects to the polymer solution or its components.

The polymer solution is extruded through a spinnerette in order to form a hollow fiber precursor. While any suitable hollow fiber spinnerette may find application in producing the hollow fibers of this invention, it is preferred that the spinnerette be of the tube-in-orifice type. Tube-in-orifice type spinnerettes are characterized by having a continuous annular ring surrounding an interior injection tube. Most desirably, the injection tube is concentrically positioned within the orifice such that substantially the same amount of polymer solution is extruded at all points of the annular ring and the resulting hollow fiber precursor has an essentially uniform wall thickness. In most tube-in-orifice type spinnerettes the polymer solution enters a cavity behind the annular ring to assist in the distribution of polymer solution around the annular ring. Sometimes at least about 4, preferably at least about 5, polymer solution ports are provided, and they may desirably be equidistantly spaced.

The size of the spinnerette will vary with the desired inside and outside diameters of the sought hollow fiber membrane. One class of spinnerettes may have orifice diameters (outside diameters) of about 300 to 1000 microns and an inside orifice diameter (often the injection tube outside diameter) of about 100 to 500 microns with an injection capillary within the injection tube. The diameter of the injection capillary may vary within the limits established by the injection tube. The projection of the injection tube is usually to the plane of the spinnerette orifice. Most often, spinnerettes are described in terms of a configuration of the entrance to the annular ring and the ratio of length to width of the annular ring portion of the spinnerette. The entrance configuration of the annular ring portion of the spinnerette may be abrupt, e.g., at an angle greater than about 80° to the direction of flow of polymer solution in the annular ring portion of the spinnerette, or may be sloped into the annular portion of the spinnerette, e.g., at an angle below about 80° C., say, about 75° to 30°, from the direction of polymer solution flow through the annular spinnerette. The ratio of the length to which the annular ring portion extends from the face of the spinnerette to the width of the annular ring at spinnerette face may vary within wide ranges; however, the length of the annular ring portion of the spinnerette should not be so excessive that undue pressure drop is incurred while passing the polymer solution through the spinnerette. Frequently, these ratios vary between about 0.7 to 2.5, say about 1 to 2.

In spinning some polymer solutions it may be desired to maintain the polymer solution at an elevated temperature in order to provide desirable spinning conditions. In such instance, a heating means may be used for maintaining the spinnerette at the desired extrusion temperature. Suitable heating means include electrical or fluid heating jackets, embedded electrical heating coils, and the like. Since the residence time of the polymer solution in the spinnerette is often relatively brief, frequently the polymer solution is heated to at or near the desired extrusion temperature prior to entering the spinnerette. Often the temperature of the polymer solution in the spinnerette is at least about 20° C. but preferably is not at such high temperatures that during the residence time of the polymer solution at such temperatures, the polymer solution is unduly adversely affected. Frequently, the polymer solution in the spinnerette is at a temperature in the range of about 20° to 90° C., say, about 25° to 80° C.

The dimensions of the hollow fiber precursor will depend on, for instance, the dimensions of the spinnerette, the rate of flow of the polymer solution through the spinnerette, the jet stretch on the hollow fiber precursor, and the rate and pressure of the fluid being injected into the bore of the hollow fiber precursor. The rate of flow of the polymer solution through the spinnerette may vary widely depending upon the take-up speed of the hollow fiber. The rate of flow, however, should not be so great as to cause fracturing of the hollow fiber precursor. Frequently, since the size of the hollow fiber may vary widely, e.g., from about 100 to 150 microns to 1000 or more microns in outside diameter and the length of hollow fiber produced per unit time (spinning speed or take-up speed) may also vary widely, e.g., from about 5 to 100 meters per minute (although higher spinning speeds can be employed providing the fiber is not unduly stretched and sufficient residence time is provided in subsequent processing steps), the spinning operations are often described in terms of jet stretch. Spinning (jet) stretch is herein defined as the ratio of (i) the cubic centimeters per minute of polymer solution extruded through the spinnerette divided by the cross-sectional area of the annular extrusion zone in square centimeters to (ii) the length in centimeters of said hollow fiber precursor extruded per minute (take-up speed). The spinning stretch is often about 0.6 to 2, say about 0.7 to 1.8, preferably about 0.75 to 1.5.

An injection fluid is introduced into the bore of a hollow fiber precursor in an amount sufficient to maintain the bore of the hollow fiber precursor open. The injection fluid may be gaseous, or, preferably, liquid at the conditions of the spinning of the hollow fiber. The injection fluid should be miscible (and is preferably miscible in all proportions) with the liquid coagulant and with the liquid carrier. Often the injection fluid is substantially a non-solvent for the polymer. In many instances the injection fluid need not be a strong non-solvent for the polymer. The injection fluid may contain one or more components, and frequently comprises at least one component of the liquid coagulant in order to enhance miscibility of the injection fluid with the liquid coagulant. Thus, frequently, the injection fluid comprises water. Often, the injection fluid also contains a solvent or weak solvent for the polymer. The temperature of the injection fluid generally approximates the temperature of the polymer solution being extruded and the temperature of the spinnerette because of heat transfer through the wall of the injection capillary positioned within the spinnerette. However, with suitable insulation or other provisions to minimize heat transfer with the injection fluid in the spinnerette, or the use of an injection fluid which is chilled prior to passing to the spinnerette, the injection fluid may be significantly cooler than the temperature of the polymer solution being extruded. The rate and pressure of the injection fluid being introduced into the bore of the hollow fiber precursor should be insufficient to result in any deleterious effects to the separation capability or structure of the hollow fiber membrane. Frequently, the rate and pressure of injection fluid is such that the ratio of the inside diameter of the hollow fiber to the inside orifice diameter of the spinnerette is less than about 2.5, and preferably this ratio is about 0.5 to 1.5 or 2.

The spinnerette may be positioned above (dry jet spinning technique) or below (wet jet spinning technique) the level of the liquid coagulant. When the dry jet spinning technique is employed, it is preferred that the components of the liquid carrier be substantially nonvolatile. The distance above the liquid coagulant at which the spinnerette is positioned (gap) in many cases may vary considerably without noticeable effect on the properties of the hollow fiber membrane. Frequently, the spinnerette is positioned within about 20 or 30 centimeters of the liquid coagulant. Desirable hollow fibers may be produced when the face of the spinnerette is within about 0.5 or less centimeters of the liquid coagulant. For sake of convenience, the spinnerette is often positioned withiin about 0.5 to 15 centimeters of the liquid coagulant.

Frequently, water comprises a major amount of the liquid coagulant sufficient to provide a suitable strength non-solvent to effect the polymer coagulation. For instance, the liquid coagulant may comprise at least about 50, say, at least about 75, and most often at least about 85, weight percent water. Advantageously, the liquid coagulant does not cause any appreciable swelling of the polymer. Since water often comprises a major amount of the liquid coagulant, the polymer preferably exhibits little, if any, swelling in water.

The liquid coagulant, particularly when making hollow fiber membranes on a continuous basis, will contain liquid carrier which is removed from the hollow fiber precursor. The liquid carrier may detract from the non-solvent strength of the liquid coagulant. The liquid coagulant is therefore desirably replaced with fresh, or recycled, liquid coagulant containing little, if any, liquid carrier. Frequently, the concentration of the liquid carrier in the liquid coagulant is less than about 10, preferably less than about 5, say, less than about 2, weight percent.

The liquid coagulant may contain additional components such as surfactants, materials which increase or decrease the non-solvent strength of the liquid coagulant with respect to the polymer, materials which enhance the solubility of components of the liquid carrier in the liquid coagulant, materials which reduce the heat of dilution of the liquid carrier in the liquid coagulant, freezing point depressors, and the like. Useful additional components for the liquid coagulants which may find application in making the hollow fiber membranes include low molecular weight alcohols such as methanol, isopropanol, etc., salts such as sodium chloride, sodium nitrate, lithium chloride, etc., organic acids such as formic acid, acetic acid, etc., and the like.

The liquid coagulant is desirably maintained at a temperature at which the polymer solution is substantially non-flowing. While suitable temperatures are generally low, some polymer solutions may be substantially non-flowing at room temperature or above. Hence, liquid coagulant temperatures of up to about 90° C. or higher may find application. Often, however, the liquid coagulant temperature is below about 35° C., and highly desirable hollow fibers are frequently produced using liquid coagulant temperatures below about 20° C., say, below about 10° C. Most often, for the sake of convenience, its temperature is above about 0° C., e.g., about 0° to 10° C. However, with suitable refrigeration equipment, and the presence of freezing point depressors in the liquid coagulant, temperatures of −15° C. and below may be achieved.

The residence time of the hollow fiber precursor in the liquid coagulant should be sufficient that the amount of coagulation at the temperature of the liquid coagulant provides adequate strength to the hollow fiber for further processing. Frequently, it is desired that coagulation of the polymer in the hollow fiber precursor occur within a few seconds such that the equipment sizes for the coagulation step are not unduly large. Since the exterior of the hollow fiber precursor directly contacts the liquid coagulant, it is generally almost instantaneously coagulated. In some instances, essentially complete coagulation of the polymer in the hollow fiber precursor under the conditions of the liquid coagulant may almost instantaneously occur. More frequently, the hollow fiber precursor exhibits an observable transition in the liquid coagulant from a clear or translucent structure to an opaque structure. This transition may be gradual, and sometimes the progress of the transition can be observed. The time for this transition under the conditions of the liquid coagulant can vary widely, but in many instances is at least about 0.001, for example, about 0.01 to 1, say, about 0.02 to 0.5, second.

Most conveniently the hollow fiber is subjected to at least one washing step to further remove liquid carrier. The washing of the hollow fiber is often initiated under substantially the same conditions (e.g., temperature) that the coagulation occurred. The temperatures employed for washing are often based on the strength of the liquid carrier-containing hollow fiber, the useful range of temperatures to which the washing liquid can be subjected, and convenience of obtaining the washing liquid at such temperatures. In general, temperatures should be avoided during washing which could result in undesirable annealing of the hollow fiber surface. Often the temperature of washing ranges from about 0° to 50° C. preferably about 0° to 35° C. Conveniently, water is employed as the washing fluid. The washing fluid may contain additives to, e.g., enhance removal of the liquid carrier. For instance, if water is the washing fluid, then a water miscible organic material (e.g., methanol, isopropanol, etc.) may assist in facilitating the removal of the liquid carrier.

Often the liquid carrier content of the hollow fiber can readily be reduced to say less than about 20 weight percent of liquid carrier, (e.g., by passing the hollow fiber through a washing liquid for 2 to 5 minutes). However, the reduction of the liquid carrier content of the hollow fiber to desirably low levels, e.g., less than about 5, and sometimes less than about 2, weight percent liquid carrier, may require relatively long periods of additional washing. This additional washing is often at least about 3 hours, and may range up to 20 or more days. The additional washing may be conducted by continuously passing washing liquid having little, if any, liquid carrier over the hollow fiber (rinsing) or by soaking, or storage, in washing liquid. Usually, a combination of rinsing and storage is employed to remove the liquid carrier from the hollow fiber. When the hollow fibers are stored in washing liquid, a periodic replacement of washing liquid may be advantageous if the concentration of liquid carrier in the washing liquid becomes undesirably high. Although the hollow fibers can be stored in the washing liquid for periods longer than 20 days, usually little additional amounts of liquid carrier are removed from the hollow fiber after such long storage periods. Most frequently, the washing of the hollow fiber continues until the liquid carrier content of the hollow fiber is less than about 4 or 5 weight percent of the hollow fiber.

The hollow fibers, after washing, are dried to remove the washing liquid. The presence of liquid in the anisotropic hollow fiber membranes can significantly reduce the flux of gases permeating the membrane and therefore is generally not desired. Suitable drying can be accomplished by exposure to a gaseous atmosphere. Air is usually a suitable gaseous atmosphere. Frequently, the drying conditons may include temperatures ranging from $-15°$ C. or below to 90° C. or more and relative humidities ranging from about 0 to 95, say, about 5 to 60 percent. Frequently, the temperature ranges from about 0° to 80° C. with absolute humidities less than about 20 or 30, say, about 5 to 15, grams per cubic meter. In many instances, drying hollow fibers under ambient laboratory conditions, e.g., about 20° to 25° C. and 40 to 60 percent relative humidity is acceptable.

The methods of this invention can provide advantageous anisotropic hollow fiber membranes comprising polymer of acrylonitrile and styrene. The anisotropic hollow fiber membranes of this invention can be particularly attractive for effecting gas separations.

The hollow fiber membranes of this invention preferably have a relatively circular cross-section with circular, concentric bores. In many instances, the hollow fiber membrane can be circular and concentric within the tolerances of the machining required to make suitable spinnerettes. The outside diameter of the hollow fiber membrane may vary widely, e.g., from about 100 or 150 to 1000 or more microns. Frequently, the outside diameter of the hollow fiber membrane is about 200 or 300 to 800 microns.

The ratio of thickness of the wall to outside diameter of the hollow fiber membrane may also vary widely depending upon the required collapse pressure which must be exhibited for a given gas separation operation. Since the porous support is open, an increase in wall thickness may not result in an undue reduction in flux through the membrane wall. Typical ratios of thickness to outside diameter are about 0.1 or 0.15 to about 0.45, most often about 0.15 to 0.4.

The void volume of the hollow fiber membranes, i.e., regions within the wall of the hollow fiber membrane vacant of the material of the hollow fiber membrane is substantial. The void volume can be determined by a density comparison with a volume of the bulk polymer (or other material of the hollow fiber) which would correspond to a hollow fiber of the same superficial gross physical dimensions and configurations as the wall of the hollow fiber membrane. Since the cellular support of the hollow fibers is open, relatively low void volumes for anisotropic hollow fiber membranes can be achieved without unduly low gas fluxes occurring. Often, the void volume is at least about 40, say, greater than about 45 or 50, volume percent, and may range up to 65 to 70 or more volume percent.

The preferred hollow fiber membranes of this invention exhibit several significant structural characteristics which enable desirable strength properties to be combined with advantageous fluid separation properties. A preferred dry, integral anisotropic hollow fiber membrane in accordance with this invention has a wall having a thin exterior skin on an open, cellular support. The exterior skin has few, if any, pores (i.e., continuous channels for fluid flow through the exterior skin). The cells in the cellular support of the hollow fiber wall are preferably relatively small in all dimensions. Desirably, the cellular support has a substantial absence of macrovoids having a maximum length to maximum width ratio greater than about 10, preferably greater than about 5. The preferred hollow fiber membranes of this invention have a substantial absence of macrovoids.

A hollow fiber membrane for gas separations is often evaluated in terms of its gas separation characteristics, i.e., its selectivity for permeating one gas as compared to at least one other gas of the gaseous mixture and flux of the selectivity permeated gas through the membrane wall, and also its strength. These properties depend on the chemical and physical nature of the material of the hollow fiber as well as the structure of the hollow fiber. Since morphological structures which play important roles in determining the gas separation characteristics of the hollow fiber membrane may be on the order of tens of angstroms or less in dimension, such structures can not be visually perceived even using the best optical microscopic techniques available. Such small structures are thus termed "submicroscopic" structures.

The combination of microscopic techniques (particularly scanning electron microscopy and transmission electron microscopy) and observable performances in characterizing hollow fiber membrane structures on a gross basis and a submicroscopic basis can be highly useful. A particularly useful microscopic technique for characterizing hollow fiber membrane structures is scanning electron microscopy. To assist in understanding the use of scanning electron microscopy in describing hollow fiber membranes in accordance with this invention, references can be made to the provided figures in which FIGS. 1a to c are scanning electron microscopic photographs of hollow fiber membranes prepared from a polymer solution containing 32 weight percent styrene/acrylonitrile copolymer (53 weight percent styrene), about 51 weight percent dimethylformamide and about 17 weight percent formamide.

Figure 1A:
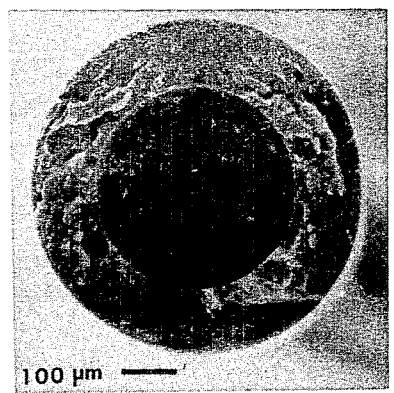
FIG. 1a illustrates the cross-section of the hollow fiber at a magnification of about 300 times.
Figure 1B:
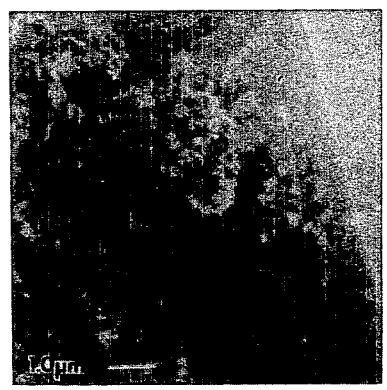
FIG. 1b shows a segment of the cross-section of the hollow fiber at the exterior edge of the hollow fiber and is at a magnification of about 20,000 times.
Figure 1C:
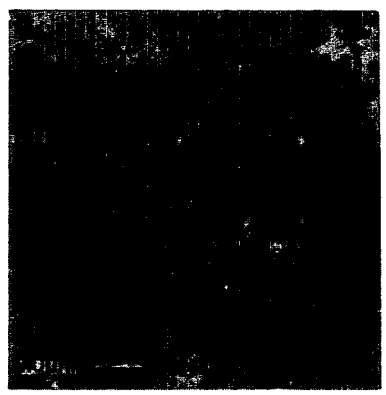
FIG. 1c shows a segment of the cross-section of the hollow fiber in the middle of the hollow fiber wall and is at a magnification of about 20,000 times.

Samples of hollow fiber membranes (such as depicted in the figures) for examination by scanning electron microscopy can conveniently be prepared by thoroughly drying the hollow fiber, immersing the hollow fiber in hexane and immediately placing the hollow fiber in liquid nitrogen such that the hollow fiber can be fractured. Upon obtaining a clean fracture of the hollow fiber, the specimen can be mounted and then sputter coated with a gold and palladium mixture (using, for instance, a Hummer II sputter coater). The coating procedure usually results in a coating of about 50 to 75 angstroms being placed on the hollow fiber sample. Accordingly, the dimensions of very small features may be obscured by the coating.

As can be seen from the figures, the structure of the preferred hollow fiber membranes is characterized by having a relatively dense structure adjacent the exterior surfaces with an underlying open cellular support. An increase in the size of the cells in the hollow fiber wall may be seen as the distance from the exterior surface increases to a generally maximum size in a middle region within the hollow fiber wall. The predominant structure of the cells in the middle region of the cross-section of the hollow fiber wall may be observed to be intercommunicating cells (cells with open passage for gas flow into adjacent cells), i.e., an open, cellular structure. This intercommunication between cells, however, may not be capable of being visually perceived if the cells are very small, e.g., less than 0.1 micron in major dimension. This open, cellular structure enables gases to readily pass through the hollow fiber wall with minimal resistance. Advantageously, the exterior skin (and interior skin, if any) provide the major portion of resistance to gas flow through the membrane wall.

The dimensions of the cells, especially larger cells which often occur in the middle region of the hollow fiber wall, can frequently be estimated using, e.g., scanning electron microscopic techniques. In estimating the approximate size and configuration of the cells the observable passages between individual cells are considered to be defects in the cell wall, and therefore, the cell dimensions do not continue through these passages. Another feature of the cells which may have importance in evaluating the strength of the membrane is the thickness of the material of the cell wall defining the larger cells in the hollow fiber membrane wall. These estimations can be conducted by visually inspecting photographs of the cell structure or by using available computer scanning techniques such as image analyzers to inspect and analyze the photograph. Suitable image analyzers include image analyzers useful in analysis of conventional textile fibers such as the Quantimet 720-20 image analyzer available from Quantimet, Munsey, N.Y.

The configuration of the cells, especially in the larger cells which often exist in the middle region of the hollow fiber wall, can vary widely. A convenient manner for characterizing the configuration of the cell is by dividing the cross-sectional cell area by the square of perimeter of the cell at that cross-section, to provide a configuration ratio. Thus the configuration ratio of a perfect circle would be about 0.08, a square would be about 0.06, and a rod, 0.01 or less. When the configuration ratio is in the range of 0.03 to 0.04, the cross-section of the cells are often roughly polygonal in appearance. Such analyses can be conducted by visually inspecting photographs of the cell structure of the hollow fiber wall or by the use of an image analyzer to inspect photographs. Conveniently, the configuration ratio can be determined by analyzing a random segment of the cross-section of the hollow fiber wall, which segment contains cells which are sufficiently large to be inspected, and which segment has an absence of macrovoids. The area of a segment examined in order to be representative is generally at least about 25 square microns (e.g., a segment having a minimum dimension of at least about 5 microns). In many desirable hollow fiber membranes in accordance with this invention the mean configuration ratio is at least about 0.025, and in many instances is at least about 0.03 or even at least about 0.035. Preferably, segments of the cross-section of the hollow fibers which contain the largest cells (excluding macrovoids) will have a mean configuration ratio of at least about 0.03, e.g., at least about 0.035.

When the cell sizes in a segment of a cross-section of the hollow fiber wall are greater than about 0.1, say, greater than 0.2, micron, analysis of photographs of cell structures as, e.g., perceived through scanning electron microscopy, may be also useful in determining the ratio of mean wall thickness to mean cell cross-sectional area. In general, the greater the ratio of thickness of the polymer supporting the cell to the cross-sectional area of the cell, the stronger the hollow fiber. Frequently, this ratio, especially for the largest cells in the hollow fiber membrane cross-section, will be at least about 0.05, say, at least about 1, and sometimes in the range of about 2 to 20, reciprocal centimeters. In analyzing photographs of smaller cells and smaller wall thicknesses of scanning electron microscope images, the thickness of the reflecting coating may become significant and should be taken into account. Often, at least a majority of the cells capable of being observed in such photographs will also have observable passages communicating with adjacent cells.

Preferably a volume (as determined by cross-sectional area) majority of wall of the hollow fiber consists of cells having a mean major dimension less than about 2 microns. Frequently, at least about 75, say, at least about 90, volume percent of the wall consists of cells having a major dimension less than about 2 microns, preferably less than about 1.5, say, less than 1, micron. In some advantageous hollow fiber membranes, a substantial absence of cells having major dimensions greater than 2 or 1.5 microns exists. As stated earlier, the size range of cells in the wall of the hollow fiber membranes usually varies substantially from a size too small to be resolved through scanning electron microscopy to cells having major dimensions of 2 microns or greater. In some hollow fibers in accordance with this invention, the predominant major dimensions of the larger cells in the hollow fiber membrane wall are less than about 0.75 microns, and in some instances essentially all of the cells in the zone of the largest cells in the hollow fiber membrane wall have major dimensions of about 0.1 to 0.7 microns. Often, this zone of the largest cells is at least about 30, say at least about 40, e.g., up to about 50 or 75, volume percent of the wall of the hollow fiber. Often, desirable hollow fiber membranes have mean major dimensions of cells which are relatively uniform regardless of the segment (say, of at least about 25 square microns in area with a minimum dimension of at least about 5 microns) observed in at least a volume majority (say, at least about 75 volume percent) of the hollow fiber wall.

In some instances hollow fiber membranes can exhibit adequate resistance to collapse even though macrovoids may be present. Macrovoids, when they appear in the hollow fiber, can vary widely in shape and position within the hollow fiber wall. Macrovoids which more closely approach the shape of a circle can generally be tolerated to a greater extent without an undue reduction in resistance to collapse than long, finger-like macrovoids. Desirably, if macrovoids occur, they occur substantially only in the thickness of the hollow fiber membrane from the interior surface to about 0.5 to 0.75 the distance to the exterior wall. The major dimension of the macrovoids is preferably less than about 0.4, say, less than 0.3, times the thickness of the hollow fiber wall.

Scanning electron microscopy may sometimes be useful in examining the porosity of the internal (bore side) skin of the hollow fiber membrane. Preferably, the internal skin is highly porous to enable permeating gases to pass into the bore of the hollow fiber with little resistance. A useful microscopic technique for estimating extremely small structural features, e.g., the porosity of the external surface (and possibly the internal surface) of the hollow fiber membranes is the surface replicate technique. In this technique, a metal coating, e.g., a platinum coating, is applied to the surface, and then the polymeric hollow fiber is dissolved from the metal coating. The metal coating is then analyzed using transmission electron microscopy, e.g., at magnifications of 50,000 times or greater, in order to determine the surface characteristics of the hollow fiber which have been replicated by the metal coating. In general, the most preferred hollow fiber membranes of this invention provide smooth surface replicates of the external surface having a substantial absence of anomalies, or irregularities, (which could represent pores) greater than about 100, often greater than about 75 or even 50, angstroms.

A particularly valuable analytical tool for kinetic evaluations of hollow fiber membranes is the permeability of gases through the membrane. The permeability of a given gas through a membrane of a given thickness (l) is the volume of gas, standard temperature and pressure (STP), which passes through the membrane per unit area of membrane per unit of time per unit of partial pressure differential. One method for reporting permeabilities is cubic centimeters (STP) per square centimeter of membrane area per second for a partial pressure differential of 1 centimeter of mercury across the membrane ($cm^3/cm^2$-sec-cmHg). Unless otherwise noted, all permeabilities are reported herein at standard temperatures and pressures and are measured using pure gases. The permeabilities are reported in gas permeation units (GPU) which is $cm^3(STP)/cm^2$-sec-cmHg$\times 10^6$; thus, 1 GPU is $1 \times 10^{-6}$cc(STP)/$cm^2$-sec-cmHg. Several of the many techniques available for determining permeabilities and permeability constants (e.g., the volume of gas (STP) passing through a given thickness of the material of the membrane per unit area per unit time per unit pressure differential across the thickness) are disclosed by Hwang, et al., *Techniques of Chemistry*, Volume VII, *Membranes in Separations*, John Wiley & Sons, 1975 (herein incorporated by reference) at Chapter 12, pages 296 to 322. The permeability of a given gas reflects permeation of that gas through the membrane regardless of the mechanism by which the gas passes through the membrane.

One useful kinetic relationship which is indicative of the freedom from pores in the separating, or barrier layer, and the range of sizes of the pores in the barrier layer, is by determining the ability of the membrane to separate different molecular weight gases, e.g., low molecular weight gases, of substantially different molecular weights. Suitable gas pairs for this analysis often include one of molecular hydrogen and helium and one of molecular nitrogen, carbon monoxide, or carbon dioxide. Preferably, the higher molecular weight gas of the gas pair selected will have a permeability constant (i.e., intrinsic permeability constant) in the polymer at least about 10 times less than the permeability constant of the lower molecular weight gas in the polymer. The analysis can be conveniently conducted at ambient temperatures (e.g., room temperature of about 25° C.) at a pressure of about 7.8 atmospheres absolute on the exterior side of the hollow fiber membrane and about 1 atmosphere absolute on the bore side of the hollow fiber membrane. The preferred hollow fiber membranes of this invention exhibit for at least one pair of gases a permeability ratio of (i) the permeability of the lower molecular weight gas $(P/l)_L$, divided by the permeability of the higher molecular weight gas $(P/l)_H$, to (ii) the square root of the molecular weight of the lower molecular weight gas, $\sqrt{MW_L}$, divided by the square root of the molecular weight of the higher molecular weight gas, $\sqrt{MH_H}$, of at least about 6, frequently at least about 7.5. The theoretical maximum permeability ratio is the ratio of the intrinsic separation factor for the gas pair to the quotient of the square root of the molecular weight of the lower molecular weight gas divided by the square root of the molecular weight of the higher molecular weight gas.

An intrinsic separation factor as referred to herein is the separation factor for a material which has no channels for gas flow across the material, and is the highest achievable separation factor for the material. Such a material may be referred to as being continuous or nonporous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be different than the intrinsic separation factor. Accordingly, a "determined intrinsic separation factor" as employed herein refers to the separation factor of a dry compact membrane of the material.

Another useful method to characterize hollow fiber membranes on a kinetic basis is by determining the permeabilities of a pair of low molecular weight gases having approximately the same molecular weights but one has a permeability constant in the polymer at least about 5, preferably, at least about 10, times greater than that of the other gas. Typical gas pairs which have approximately the same molecular weight but substantially differ in permeability constants include ammonia and methane; carbon dioxide and propane; etc. This relationship can be expressed as the quotient of the difference between the permeability of the more readily permeated gas, $(P/l)_F$, and the permeability of the less readily permeated gas, $(P/l)_S$, divided by $(P/l)_S$ times the permeability constant of the less readily permeated gas, $P_S$ divided by the permeability constant of the more readily passed gas $P_F$:

$$\left[\frac{(P/l)_F - (P/l)_S}{(P/l)_S}\right]\left[\frac{P_S}{P_F}\right]$$

In many instances, this relationship is at least about 0.001, say, at least about 0.01, preferably at least about 0.02. This relationship is indicative of the material of the hollow fiber membrane effecting at least a portion of the separation Another useful kinetic analysis of a hollow fiber membrane is the ratio of the permeability of a gas to the permeability constant of the material of the hollow fiber for the gas:

$(P/l)/P$

The gas employed to determine this relationship preferably readily permeates the membrane, e.g., hydrogen, helium, ammonia, or the like. Often this ratio is at least about $5 \times 10^4$, say, at least about $1 \times 10^5$, preferably at least about $2 \times 10^5$, up to about $1 \times 10^6$, say, about $1 \times 10^5$ to $0.6 \times 10^6$, reciprocal centimeters. This relationship is indicative of a low resistance to gas flow through the hollow fiber membrane structure and thus the high permeabilities of the desired permeating gas that can be achieved.

The structure of the hollow fiber membranes of this invention can also be observed through other kinetic evaluations. For instance, dried hollow fiber membranes exhibit very little liquid water permeability due to the existence of few, if any, pores in the separating or barrier, layer. The water permeability is often less than about $0.5 \times 10^{-6}$, or even less than about $0.2 \times 10^{-6}$, say, less than about $0.1 \times 10^{-6}$, and sometimes less than $0.01 \times 10^{-6}$ cm$^3$ (liquid)/cm$^2$-sec-cmHg, even after soaking in room temperature (25° C.) water for 4 days. The water permeability determination can conveniently be at room temperature with a pressure drop of 3.4 atmospheres from the feed side to permeate side of the membrane at an absolute pressure of about 4.4 atmospheres on the feed side. Frequently, the maximum pore size of the separating, or barrier layer of the hollow fiber membrane is less than about 250 angstroms, and often is less than about 150, e.g., less than about 100 angstroms.

A method for evaluating the size and openness of the cellular support is by subjecting the hollow fiber membrane to the conventional Brunauer, Emmett and Teller (BET) adsorption analysis for determining surface areas. In a BET analysis, a substantially monolayer of a gas, e.g., nitrogen, is sought to be adsorbed on the available internal surface of the hollow fiber and the amount of adsorbed gas is determined and is believed to be proportional to the available surface area. The BET analysis technique described herein is substantially conducted such that the internal surface area of cells which are not open does not contribute significantly to determination of the available surface area. Smaller cells provide more surface area per gram of polymer than larger cells. Consequently, a BET analysis can provide an indication of the openness of cells which are too small to be resolved by, e.g., scanning electron microscopy. Many hollow fiber membranes in accordance with this invention exhibit surface areas as determined by the BET method of at least about 18 or 20, preferably at least about 22, square meters per gram. At very high BET determined surface areas, e.g., above 50 or 70, square meters per gram, the hollow fiber is often observed to have a fibrillar structure instead of a cellular structure. Fibrillar structures can sometimes be relatively weak in comparison to cellular structures. Commonly, the hollow fiber membrane internal surface area as determined by a BET analysis is in the range of about 18 or 22 to 30 square meters per gram. Hollow fibers which have a predominantly closed-cell structure often exhibit BET determined surface areas of less than about 18 to 20 square meters per gram. Another useful method for evaluating surface areas determined by BET analysis is in terms of surface area per unit volume of hollow fiber wall. Frequently, desirable hollow fiber membranes of the invention exhibit surface areas as determined by a BET analysis of about 10 to 30, say, about 10 to 20, square meters per cubic centimeter of hollow fiber wall volume.

The structures of the preferred hollow fiber membranes of this invention enable the hollow fibers to withstand large pressure differentials from the exterior to the bore of the hollow fiber membrane, i.e., the hollow fiber membranes exhibit high collapse pressures. Thus, the hollow fiber membranes can have a relatively low ratio of thickness (wall) to outside diameter while maintaining a desired structural strength and thereby provide an advantageously large bore diameter to minimize the pressure drop to gases passing within the bore. The collapse strength from external pressure of a tube having a foamed wall structure depends upon the strength of the material of the tube, the wall thickness of the tube, the nature of the foamed wall structure, the outside diameter of the tube, the density of the foam and the uniformity of the hollow fiber configuration (i.e., whether the outside and inside configurations are concentric and circular). In general, the collapse pressure of the hollow fiber membranes of this invention exhibits an approximation relationship to the strength of the material of the hollow fiber and the wall thickness divided by the outside diameter of the hollow fiber (t/D). This approximation relationship can be expressed in terms of the tensile strength of the material of the hollow fiber and the cube of the ratio of the wall thickness to the outside diameter. Similar relationships can exist with respect to other strength properties of the material of the hollow fiber such as modulus of elasticity and the like. Frequently, the hollow fiber membranes of this invention exhibit a collapse pressure (kilograms/square centimeters) greater than about $4 T_S(t/D)^3$, where $T_S$ is the tensile strength at yield (or at break if appropriate) in kilograms per square centimeter. More advantageous hollow fiber membranes in accordance with this invention also exhibit a collapse pressure greater than about $10 (\phi) (T_S) (t/D)^3$ wherein $\phi$ is the volume fraction of material of the hollow fiber membrane in the wall of the hollow fiber membrane. The volume fraction of the material of the hollow fiber membrane ($\phi$) is 1 minus the quantity of void volume (volume percent)/100.

Anisotropic hollow fiber membranes can be prepared in accordance with the method of this invention to minimize the separating, or barrier, layer thickness. Frequently, the tendency to produce pores in the hollow fiber membranes is increased when the barrier layer is decreased. In accordance with the teachings of Henis, et al., U.S. patent application Ser. Nos. 742,159, filed Nov. 15, 1976, now abandoned, and 832,481, filed Sept. 13, 1977, now U.S. Pat. No. 4,230,463, herein incorporated by reference, a coating may be provided in occluding contact with a gas separation membrane containing pores to enhance the selectivity of separation exhibited by the gas separation membrane wherein the coating material does not significantly effect the separation. Usually, suitable hollow fiber membranes for coating in accordance with the invention of Henis, et al., exhibit a permeability ratio as defined above of at least about 6.5, frequently, at least about 7.5. In many instances, the permeability ratio of uncoated hollow fibers most advantageously coated is less than about 40, e.g., less than about 20 or 25. The ratio of the permeability of a gas (preferably a gas which readily permeates the material of the membrane) to the permeability constant of the material of the hollow fiber membrane for the gas is at least about $1 \times 10^5$, preferably at least about $2 \times 10^5$, up to, say, $1 \times 10^6$, reciprocal centimeters. Advantageous hollow fiber membranes for coating often exhibit a hydrogen flux of about 100 to 1200 GPU or more and exhibit ratios of hydrogen permeability to methane permeability of about 1.5 or 2 to about 10, say, about 2 to 7.

In many instances the selectivity of separation for at least one pair of gases after coating the hollow fiber membrane is at least about 40 percent, say, at least about 50 percent, of that exhibited by an essentially non-porous membrane of the same material, i.e., a non-porous membrane through which gases pass essentially only by interaction with the material of the membrane. The selectivity of separation of the coated hollow fiber may be at least about 35, e.g., at least about 50 or 100, percent greater than the selectivity of separation for said pair of gases which could be provided by the material of the coating when in the form of an essentially non-porous membrane. Moreover, after coating, the flux which can be obtained using the coated hollow fiber is not unduly reduced, e.g., the ratio of permeability of a gas to the permeability constant of the material of the hollow fiber membrane is preferably at least about $5 \times 10^4$, preferably, at least about $1 \times 10^5$, reciprocal centimeters.

Particularly advantageous materials for coatings to enhance the selectivity of separation of the hollow fiber membranes do not unduly reduce the permeation rate (flux) of the gas or gases desired to be permeated through the wall of hollow fiber membrane. Often, the materials for the coatings have relatively high permeability constants. The material of the coating should be capable of providing occluding contact with the exterior surface of the hollow fiber. For instance, when applied it should sufficiently wet and adhere to the hollow fiber to enable occluding contact to occur. The wetting properties of the material of the coating can be easily determined by contacting the material of the coating, either alone or in a solvent, with the material of the hollow fiber. Moreover, based on estimates of the average pore diameter in the separating thickness of the hollow fiber, materials for the coating of appropriate molecular size can be chosen. If the molecular size of the material of the coating is too large to be accommodated by the pores, the material may not be useful to provide occluding contact. If, on the other hand, the molecular size of the material for the coating is too small, it may be drawn through the pores of the hollow fiber during coating and/or separation operations. When the pores are in a wide variety of sizes, it may be desirable to employ a polymerizable material for the coating material which is polymerized after application to the hollow fiber, or to employ two or more coating materials of different molecular sizes, e.g., by applying the materials of the coating in order of their increasing molecular sizes.

The materials for the coating may be natural or synthetic substances, and are often polymers, and advantageously exhibit the appropriate properties to provide occluding contact with the hollow fiber. Synthetic substances include both addition and condensation polymers. Typical of the useful materials which can comprise the coating are polymers which can be substituted or unsubstituted, and which are solid or liquid under gas separation conditions, and include synthetic rubbers; natural rubbers; relatively high molecular weight and/or high boiling liquids; organic prepolymers; poly(siloxanes) (silicone polymers); polysilazanes; polyurethanes; poly (epichlorhydrin); polyamines; polyimines; polyamides; acrylonitrile-containing copolymers such as poly($\alpha$-chloroacrylonitrile) copolymers; polyesters (including polylactams and polyarylates), e.g., poly(alkyl acrylates) and poly (alkyl methacrylates) wherein the alkyl groups have, say, 1 to about 8 carbons polysebacates, polysuccinates, and alkyd resins; terpinoid resins; linseed oil; cellulosic polymers; polysulfones, especially aliphatic-containing polysulfones; poly(alkylene glycols) such as poly(ethylene glycol), poly(propylene glycol), etc.; poly(alkylene) polysulfates; polypyrrolidones; polymers from monomers having $\alpha$-olefinic unsaturation such as poly(olefins), e.g., poly(ethylene), poly(propylene), poly(butadiene), poly (2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly (methylvinylketone)), poly(vinyl esters) (e.g., poly(vinyl benzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly(xylylene oxide); polycarbonates; polyphosphates, e.g., poly(ethylenemethylphosphate); and the like, and any interpolymers including block interpolymers containing repeating units from the above, and grafts and blends containing any of the foregoing. The polymers may or may not be polymerized after application to the hollow fiber membrane.

Particularly useful materials for coatings comprise poly(siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1000. Often, the poly(siloxanes) have a molecular weight of about 1,000 to 300,000 or more when applied to the hollow fiber membrane. Common aliphatic and aromatic poly(siloxanes) include the poly (monosubstituted and disubstituted siloxanes), e.g., wherein the substituents are lower aliphatic, for instance, lower alkyl, including cycloalkyl, especially methyl, ethyl, and propyl, lower alkoxy; aryl including mono or bicyclic aryl including bis phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups, glycidyl groups, amino groups, vinyl groups, and the like. The poly(siloxane) may be cross-linked in the presence of a cross-linking agent to provide a silicone rubber, and the poly(siloxane) may be a copolymer with a cross-linkable comonomer such as $\alpha$-methylstyrene to assist in the cross-linking. Typical catalysts to promote cross-linking include the organic and inorganic peroxides. Cross-linking may occur prior to application of the poly (siloxane) to the hollow fiber, but preferably the poly (siloxane) is cross-linked after being applied to the hollow fiber. Frequently, the poly(siloxane) has a molecular weight of about 1,000 to 100,000 or more prior to cross-linking. Particularly advantageous poly (siloxanes) comprise poly(dimethylsiloxane), poly (hydrogenmethylsiloxane), poly(phenylmethylsiloxane), poly(trifluoropropylmethylsiloxane), copolymer of $\alpha$-methylstyrene and dimethylsiloxane, and post-cured poly(dimethylsiloxane)-containing silicone rubber having a molecular weight of about 1,000 to 50,000 or more prior to cross-linking. Some poly(siloxanes) do not sufficiently wet the material of the hollow fiber to provide as much occluding contact as is desired. However, dissolving or dispersing the poly(siloxane) in a solvent which does not substantially affect the material of the hollow fiber can facilitate obtaining occluding contact. Suitable solvents include normally liquid alkanes, e.g., pentane, isopentane, cyclohexane, etc.; aliphatic alcohols, e.g., methanol, some halogenated alkanes and dialkyl ethers; dialkyl ethers; and the like; and mixtures thereof.

The coating may be in the form of an essentially noninterrupted membrane, i.e., an essentially non-porous membrane, in contact with the hollow fiber, or the coating may be discontinuous, or interrupted. Preferably, the coating is not so thick as to adversely affect the performance of the hollow fiber, e.g., by causing an undue decrease in flux or by causing such a resistance to gas flow that the separation factor of the coated hollow fiber is essentially that of the coating. Often the coating may have an average thickness of up to about 50 microns. When the coating is interrupted, of course, there may be areas having no coating material. The coating may often have an average thickness ranging from about 0.0001 to 50 microns. In some instances, the average thickness of the coating is less than about 1 micron, and may even be less than about 5000 angstroms. The coating may comprise one layer or at least two separate layers which may or may not be of the same materials.

The coating may be applied in any suitable manner, e.g., by a coating operation such as spraying, brushing, immersion in an essentially liquid substance comprising the material of the coating or the like. The material of the coating is preferably contained in an essentially liquid substance when applied and may be in a solution using a solvent for the material of the coating which is substantially a non-solvent for the material of the hollow fiber. Conveniently, the coating may be applied after the assembly of the hollow fiber membranes in a bundle for use in a permeator, or even after installation in the permeator, to minimize the handling of the coated hollow fiber membrane.

The hollow fiber membranes of this invention are widely applicable in gas separation operations, particularly the separation of low molecular weight gases, by interaction of the permeating gases with the material of the hollow fiber. Gaseous mixtures which may be employed in gas separation operations are comprised of gaseous substances, or substances that are normally liquid or solid but are vapors at the temperatures under which the separation is conducted. Typical gas separation operations which may be desired include separations of, for example, oxygen from nitrogen; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane, and ethylene; ammonia from at least one of hydrogen, nitrogen, argon, and hydrocarbon of 1 to about 5 carbon atoms, e.g., methane; carbon dioxide from at least one of carbon monoxide and hydrocarbon of 1 to about 5 carbon atoms, e.g., methane; helium from hydrocarbon of 1 to about 5 carbon atoms, e.g., methane; hydrogen sulfide from hydrocarbon of 1 to about 5 carbon atoms, for instance, methane, ethane, or ethylene; and carbon monoxide from at least one of hydrogen, helium, nitrogen, and hydrocarbon of 1 to about 5 carbon atoms. It is emphasized that hollow fiber membranes in accordance with this invention may find beneficial application in the separation operations using other gas mixtures.

The following examples are provided to assist in the understanding of the invention and are not in limitation of the invention. All parts and percentages of gases are by volume and all parts and percentages of liquids are by weight, unless otherwise noted. All gas permeabilities are determined using substantially pure gases with a shell side pressure of about 29 atmospheres absolute and about 1 atmosphere at the bore side of the hollow fiber membrane unless otherwise indicated.

EXAMPLE 1

Thirty six parts by weight of copolymer of acrylonitrile and styrene containing about 47 weight percent acrylonitrile and having a specific viscosity of about 0.110 to 0.115 and 64 parts by weight of a liquid carrier consisting of 75 parts by weight of dimethylformamide and 25 parts by weight of formamide (reagent grade) are charged to a heated dope mixer. In the heated dope mixer the polymer solution is maintained at about 80° C. for a time sufficient to completely dissolve the polymer (residence times of about 4 hours are generally employed). The polymer solution is transferred to a deaerator which is heated to about 75° to 80° C. and has a dry nitrogen atmosphere at about a pressure of about 0.3 to 0.4 atmospheres absolute. Adequate deaeration is generally achieved in about 16 hours residence time in the deaerator.

The deaerated polymer solution is pumped at a rate of about 7.9 grams per minute to a tube-in-orifice-type spinnerette having an orifice diameter of 533 microns, an injection tube outside diameter of 203 microns and an injection capillary diameter of 127 microns. The spinnerette has five equidistant polymer solution entrance ports positioned behind the annular extrusion zone and is maintained at a temperature approximately 50° to 58° C. by the use of an external, electrical heating jacket; and the temperature of the polymer solution approximates this temperature. Deionized water at about ambient temperature (20° to 25° C.) is fed to the spinnerette at a rate of about 2 milliliters per minute. While in the spinnerette, the deionized water is warmed by heat transfer. The spinnerette is positioned about 10.2 centimeters above the coagulation bath. The hollow fiber precursor is extruded at a rate of about 42.7 meters per minute.

The hollow fiber precursor passes downwardly from the spinnerette into an elongated coagulation bath. The coagulation bath contains substantially tap water and about 4 to 8 liters per hour of fresh tap water is added and coagulation bath liquid (liquid coagulant) purged at the same rate. The liquid coagulant is maintained at a temperature of about 1° to 5° C. The hollow fiber precursor passes vertically downward into the liquid coagulant for a distance of about 17 centimeters, passes around a roller to a slightly upwardly slanted path through the liquid coagulant and then exits from the coagulation bath. The distance of immersion in the coagulation bath is about 1 meter.

The hollow fiber from the coagulation bath is then washed with tap water in three sequential godet baths. In the first godet bath, the hollow fiber is immersed for a distance of about 10 to 13 meters. The first godet bath is maintained at a temperature of about 1° to 5° C., and about 4 to 8 liters per hour of fresh water is added to the first godet bath. The second and third godet baths are at about 16° to 19° C. and fresh water is continuously added to these godet baths. The wet hollow fiber has an outside diameter of about 490 to 500 microns and an inside diameter of about 250 microns.

The hollow fiber, while being maintained wet with water, is wound on a bobbin using a Leesona winder with as little tension as possible. The bobbin is placed in a vessel containing tap water, and tap water is added and purged from the vessel for about 16 to 24 hours at a rate of about 40 to 50 liters per hour at tap water temperatures (10° to 20° C.). If desired, the bobbin may be stored in the vessel containing tap water at about ambient temperature (20° to 25° C.). The hollow fiber, while being maintained wet, is wound on a skeiner to form hanks of hollow fiber. The winding of the hollow fiber on the skeiner is conducted using the minimum tension required to effect the winding. The hanks of hollow fiber are hung vertically and are allowed to dry for about 16 to 24 hours in air at a temperature of about 30° C. and 50 percent relative humidity. The dried hollow fiber has an outside diameter of about 470 microns and an inside diameter of about 235 microns.

Test loops of ten hollow fiber each of about 15 centimeters in length are prepared. At one end, the test loop is embedded in a tube sheet through which the bores of the hollow fibers communicate. The other end is plugged. The bores of the hollow fibers in each test loop are subjected to a vacuum (about 50 to 100 millimeters of mercury absolute pressure) for about 10 minutes. Each of the test loops is immersed in a coating solution of about 1 weight percent post-curable polydimethylsiloxane (Sylgard 184 obtainable from Dow Corning Corp.) in n-pentane while maintaining the vacuum for about 10 minutes and then removed from the coating solution. The vacuum is contained for about 10 minutes after the test loop is removed from the coating solution, and the test loops are dried at ambient laboratory conditions (20° to 25° C., about 40 to 60 percent relative humidity). The permeabilities of the test loops to hydrogen and methane are determined using essentially pure gases at ambient laboratory temperature (about 20° to 25° C.) with the exterior, feed surface side (shell side) of the hollow fibers being at a pressure of about 29 atmospheres absolute and the bore side of the hollow fiber being at about 1 atmosphere absolute. The determined permeabilities generally vary somewhat from test loop to test loop, and some variations may be due to leaks in the tube sheet, damage to the hollow fiber due to handling, or the like. The average hydrogen permeability often ranges from about 80 to 90 GPU ($1 \times 10^6$ cc(STP)/cm$^2$-sec-cmHg) and the average carbon monoxide permeability often is about 1 GPU. The ratio of the permeabilities (separation factor) for hydrogen over carbon monoxide is often about 80 to 90. The failure pressure of the hollow fiber is determined to be about 90 to 100 kilograms per square centimeter. Similar permeability measurements are conducted on the uncoated hollow fiber, and the average hydrogen permeability often ranges from about 130 to 300 GPU and the separation factor for hydrogen over carbon monoxide is often about 3.5 to 6.

EXAMPLE 2

The procedure described in Example 1 is substantially repeated except as follows. The polymer solution contains 32 weight percent of a styrene/acrylonitrile copolymer (about 53 weight percent styrene) having a weight average molecular weight of about 200,000 and a number average molecular weight of about 100,000 and 68 weight percent of a liquid carrier containing 75 parts by weight of dimethylformamide and 25 parts by weight of formamide. The polymer solution is spun through a spinnerette which is about 0.3 centimeter below the surface of the liquid in the coagulation bath. The spinnerette has an outside diameter of 635 microns, an inside diameter of 254 microns, and an injection capillary diameter of about 72 microns. The polymer solution feed rate is about 7.2 cubic centimeters per minute and the spinning speed is about 30.5 meters per minute. The temperature of the polymer solution is about 70° C. in the spinnerette. The coagulation bath and first godet bath are at about 3° C. and the second and third godet baths are at about 20° C. The residence time of the hollow fiber in each of the godet baths is about 56.9 seconds. The hollow fiber has an outside diameter of 541 microns and an inside diameter of 319 microns. The collapse pressure is about 42 kilograms per square centimeter. The hydrogen permeability of the coated hollow fiber is about 113 GPU and the carbon monoxide permeability is about 2.9 GPU.

This procedure is substantially repeated except that the spinnerette is positioned about 10.2 centimeters above the liquid level in the coagulation bath, the spinning speed is about 39.6 meters per minute, and the godet bath residence time is 43.8 seconds. The outside diameter of the hollow fiber is about 495 microns and the inside diameter is about 302 microns. The hydrogen permeability of the coated hollow fiber is 103 GPU and the carbon monoxide permeability is 2.9 GPU.

EXAMPLE 3

The procedure of Example 2 is substantially repeated except as set forth in Table I.

TABLE I

| Run No. | Spinnerette Position | Approximate Polymer Solution Temp. °C. | Spinning Rate m/min. | Godet Bath Residence, sec. | Fiber Dimensions Micron Outside | Fiber Dimensions Micron Inside | Permeabilities, Coated, GPU Hydrogen | Permeabilities, Coated, GPU Carbon Monoxide | Permeabilities, Coated, GPU Methane | Collapse Pressure kg/cm² |
|---|---|---|---|---|---|---|---|---|---|---|
| 865-3 | Dry, 10.2 cm gap. | 80 | 42.7 | 40.6 | 550 | 293 | 140 | 2.8 | 3.9 | 56 |
| 865-4 | Immersed, 0.3 cm depth | 80 | 42.7 | 40.6 | 572 | 286 | 135 | 7.2 | 21 | — |

EXAMPLE 4

The procedure of Example 2 is substantially repeated except as set forth in Table II. The dimensions and permeabilities of the hollow fiber membranes are reported in Table III.

TABLE II

| Run | Polymer Composition Weight Percent Acrylonitrile | Polymer Composition Weight Percent Styrene | Liquid Carrier (Wt. Percent) | Polymer Concentration in Dope, Wt. Percent | Jet Size OD(μ), ID(μ) Capillary (μ) | Spinning Speed m/min. | Dope Rate cc/min. | Dope Temp. at Jet, °C. | Jet Position | Temperature, °C. Coag. | Temperature, °C. 1st. Godet | Temperature, °C. 2nd. Godet | Temperature, °C. 3rd. Godet |
|---|---|---|---|---|---|---|---|---|---|---|---|---|---|
| 712-4 | 33 | 67 | Dimethylformamide (80) Formamide (20) | 27.5 | 635/254/152 | 19.7 | 7.2 | 3 | Wet | 3 | 3 | RT | RT |
| 758-1 | 44 | 56 | Dimethylformamide (100) | 25 | 635/254/152 | 19.7 | 7.2 | 1 | Wet | 1 | 1 | RT | RT |
| 760-3 | 44 | 56 | Dimethylformamide (60) Methanol (40) | 25 | 635/254/152 | 30 | 7.2 | 3 | Wet | 3 | 3 | RT | RT |
| 633-2 | 66 | 38 | Dimethylformamide (80) Formamide (20) | 34 | 508/152/100 | 42.4 | 4.5 | 71 | Dry (16 cm gap) | 3 | 1 | 15 | 15 |
| 714-1 | 33 | 67 | Dimethylformamide (90) Ethylene Glycol (10) | 25 | 635/254/152 | 19.7 | 7.2 | 2 | Wet | 2 | 2 | RT | RT |

TABLE III

| Run | Fiber Dimensions* OD(μ)/ID(μ) | Permeability, GPU Before Coating | Permeability, GPU After Coating | Separator Factors for Hydrogen on Carbon Monoxide Before Coating | Separator Factors for Hydrogen on Carbon Monoxide After Coating |
|---|---|---|---|---|---|
| 712-4 | 665/315 | 1294 | 32 | 3 | 32 |
| 758-1 | 675/330 | 286 | 3.5 | 48 | 8 |
| 760-3 | 475/225 | 340 | 24 | 3.2 | 25 |
| 633-2 | 510/270** | 120 | 41 | 3.2 | 112 |
| 714-1 | 680/335 | 120 | 3.4 | 22 | 5.9 |

*Before drying
**Bore is oval

It is claimed:

1. A dry, integral anisotropic hollow fiber membrane for the separation of at least one gas of a gaseous mixture comprising a homogeneously-formed, thin, exterior, separating layer on an open, cellular support and comprising polymer of acrylonitrile and styrene in which polymer, acrylonitrile comprises at least about 20 mole percent of said polymer and styrene comprises up to about 60 mole percent of said polymer, wherein a volume majority of the wall of said hollow fiber membrane consists of cells having a mean major dimension of less than about 2 microns and said open, cellular support comprising a substantial absence of macrovoids having a major dimension greater than about 3 microns and a ratio of maximum length to maximum width greater than about 10, said hollow fiber membrane exhibiting a ratio of permeability of at least one of hydrogen, helium and ammonia to the permeability constant of the material of the hollow fiber membrane for said gas of at least about $5 \times 10^4$ reciprocal centimeters; a permeability ratio of (i) the permeability of a lower molecular weight gas divided by the permeability of a higher molecular weight gas to (ii) the square root of the molecular weight of said lower molecular weight gas divided by the square root of the molecular weight of said higher molecular weight gas of at least about 6, wherein said lower molecular weight gas is one of hydrogen and helium and said high molecular weight gas is one of nitrogen, carbon monoxide and carbon dioxide and has a permeability constant in the polymer at least about 10 times less than the permeability constant of said lower molecular weight gas in said material; and a collapse pressure of at least about $4(T_S)(t/D)^3$ wherein $T_S$ is the tensile strength of the polymer, t is the wall thickness and D is the outside diameter of the hollow fiber membrane, said membrane having a permeability for water of less than about $0.05 \times 10^{-6}$.

2. The hollow fiber membrane of claim 1 having a substantial absence of macrovoids.

3. The hollow fiber membrane of claim 1 in which at least about 90 volume percent of the wall of the hollow fiber membrane consists of cells having a major dimension less than about 2 microns.

4. The hollow fiber membrane of claim 1 in which at least about 90 volume percent of the wall of the hollow fiber membrane consists of cells having a major dimension less than about 1 micron.

5. The hollow fiber membrane of claim 1 in which the void volume of the wall of the hollow fiber membrane is at least about 40 and up to about 70 volume percent.

6. The hollow fiber membrane of claim 5 in which the void volume of the wall of the hollow fiber membrane is greater than about 45 and up to about 65 volume percent.

7. The hollow fiber membrane of claim 1 or 5 in which the collapse pressure of the hollow fiber membrane is greater than about $10\ (\phi)(T_S)(t/D)^3$ wherein $\phi$ is the volume fraction of the material of the hollow fiber membrane in the wall of the hollow fiber membrane.

8. The hollow fiber membrane of claim 1 or 5 which exhibits a relationship of (i) the quotient of the difference between the permeabilities of a more readily permeated gas and a less readily permeated gas divided by the permeability of the less readily permeated gas times (ii) the ratio of the permeability constant of the less readily permeated gas to the permeability constant of the more readily permeated gas of at least about 0.01, wherein the more readily permeated gas has a permeability constant at least about 5 times greater than the permeability constant of the less readily permeated gas and the more readily permeated gas and less readily permeated gas have approximately the same molecular weight.

9. The hollow fiber membrane of claim 1, 2 or 5 in which the external skin is less than about 1000 angstroms.

10. The hollow fiber membrane of claim 1, 2 or 5 in which the external skin is less than about 500 angstroms.

11. The hollow fiber membrane of claim 1 or 5 in which the permeability ratio is at least about 7.5.

12. The hollow fiber membrane of claim 1 in which the material of the hollow fiber membrane exhibits a tensile strength of at least about 350 kilograms per square centimeter.

13. The hollow fiber membrane of claim 1 wherein acrylonitrile comprises about 30 to 80 mole percent of the polymer.

14. The hollow fiber membrane of claim 1 or 13 wherein the polymer of acrylonitrile and styrene has a weight average molecular weight of about 75,000 to 500,000.

15. The hollow fiber membrane of claim 1, 2 or 13 wherein the polymer consists essentially of polymer of acrylonitrile and styrene.

16. The hollow fiber membrane of claim 2, 5 or 9 wherein styrene comprises about 10 to 50 mole percent of the polymer and acrylonitrile comprises about 30 to 80 percent of the polymer.

17. The hollow fiber membrane of claim 1, 2 or 13 wherein the outside diameter is about 300 to 800 microns and the ratio of wall thickness to outside diameter is about 0.15 to 0,4.

* * * * *